E. A. HEATH.
Improvement in Cuspadores.

No. 119,706. Patented Oct. 10, 1871.

Witnesses,
C. C. Livings
A. Hoermann.

Inventor,
E. A. Heath
by his attorney
T. D. Stetson

UNITED STATES PATENT OFFICE.

EUGENE A. HEATH, OF NEW YORK, N. Y.

IMPROVEMENT IN CUSPADORES.

Specification forming part of Letters Patent No. 119,706, dated October 10, 1871.

*To all whom it may concern:*

Be it known that I, EUGENE A. HEATH, of New York city, in the State of New York, have invented certain new and useful Improvements in Cuspadores, of which the following is a specification:

I form the cuspadore principally of papier maché, vulcanized rubber, or analogous non-metallic material, giving it a swelled form a little above the base, and load the base with a mass of lead or analogous heavy material, which causes it to right itself when overturned.

The following is a description of what I consider the best means of carrying out the invention.

The accompanying drawing forms a part of this specification.

Figure 1:
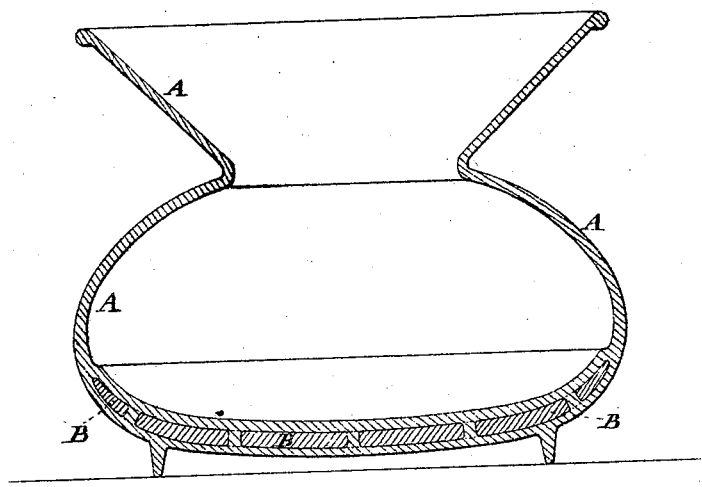
Figure 2:
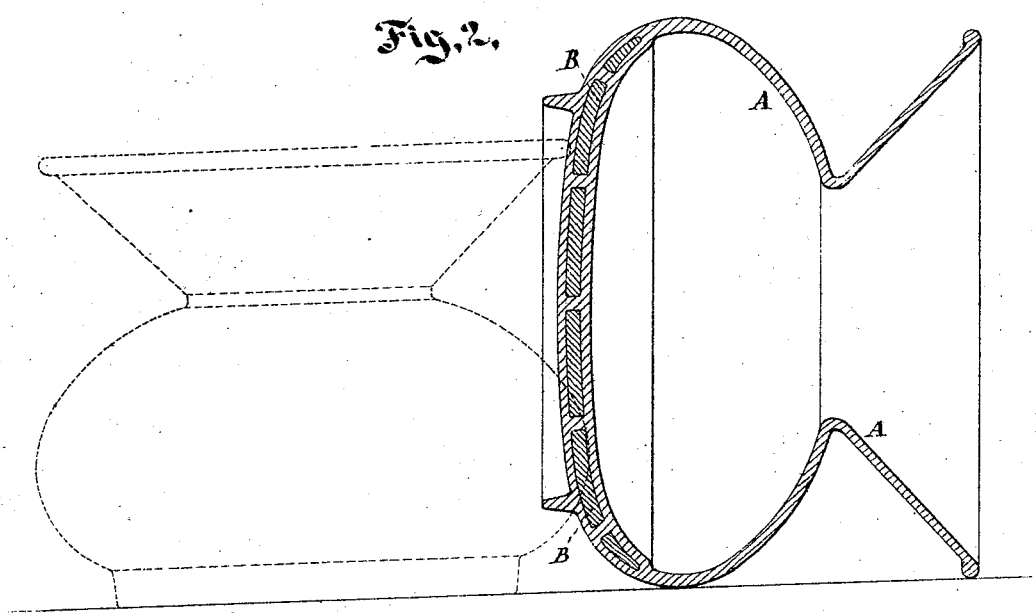
Figure 4:
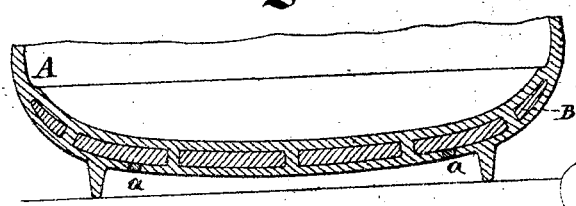

Figure 1 is a central vertical section. Fig. 2 is a section through the mass or plate of heavy material in the base, represented as detached from the lighter material; and Fig. 4 is a section showing certain means of holding up the heavy material while the other matter is soft.

Fig. 2 is a view intended to correspond exactly with Fig. 1, except in position. It is a double figure, showing the conditions when the cuspadore is for a moment upset. The strong lines show it in its upset position; the dotted lines show it in the proper upright position, which it assumes immediately by reason of the form and of the gravity of the loaded base.

Similar letters of reference indicate corresponding parts in all the figures.

A is the India-rubber or analogous gum, either alone or in its ordinary or suitable compounds. It is formed in the shape represented by molding or other ordinary or suitable manner, and made to inclose in its thickened base a large plate of lead, cast-iron, or analogous heavy material, marked B. This heavy material is prepared in the proper form by molding or otherwise, and is treated by saturating the surface with India rubber or otherwise, so as to afford as great an affinity as possible by which it may adhere to the India rubber outside. As a means of insuring a permanent union I perforate the mass B with numerous holes, through which the plastic material A flows and unites the layers on the upper and lower sides. The material B is intended to remain permanently embedded in the material A, without exposing any of the material B either on the upper or lower surface of the material A.

In all washings or other treatment of the cuspadore it may be treated in all respects as if formed entirely of the surface material A; but it will be found to possess novel qualities by reason of the increased strength and stiffness of its base, due to the embedded plate B, and particularly to be so greatly loaded at the base, by reason of this embedded material, that it will instantly right itself when overturned. This self-righting property is due partly to the loaded base and partly to the form. I esteem both these qualities essential, and believe that they have never before been combined in a cuspadore made with a surface of plastic material.

I propose to make the upper portion and the surfaces of the bottom part—or, in other words, the main body—of the structure of papier maché or various other materials in place of vulcanized rubber, if preferred. When vulcanized rubber or gutta-percha is used the molds in which it is vulcanized must, of course, be adapted in form to the form of the cuspadore.

Figure 3:
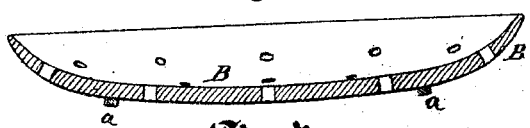

To facilitate the holding of the heavy mass B in its proper position in the interior of the mass A, while the latter is in a soft condition I propose to provide it with a bottom of the soft material A, previously hardened before placing it in the mold to receive the remainder of the material A. This previously bottoming may extend over the entire base of the piece B, or only over certain points, in the manner of legs. The latter condition is preferable for some reasons, and is shown in Figs. 3 and 4. The ordinary or suitable means should be adopted in such case to induce a firm union between the old or previously-hardened material A on the bottom and the newly-applied material *a*, which is added afterward in the mold. The material A should be a unit when the cuspadore is complete.

I claim as my invention—

A cuspadore composed in part of light material, A, in the form substantially as shown, with a weight, B, of lead or analogous material embedded in the base and adapted to serve therewith, in the manner and for the purposes herein specified.

In testimony whereof I have hereunto set my name in presence of two subscribing witnesses.

E. A. HEATH.

Witnesses:
   C. C. LIVINGS,
   A. HOERMANN.